Patented July 19, 1949

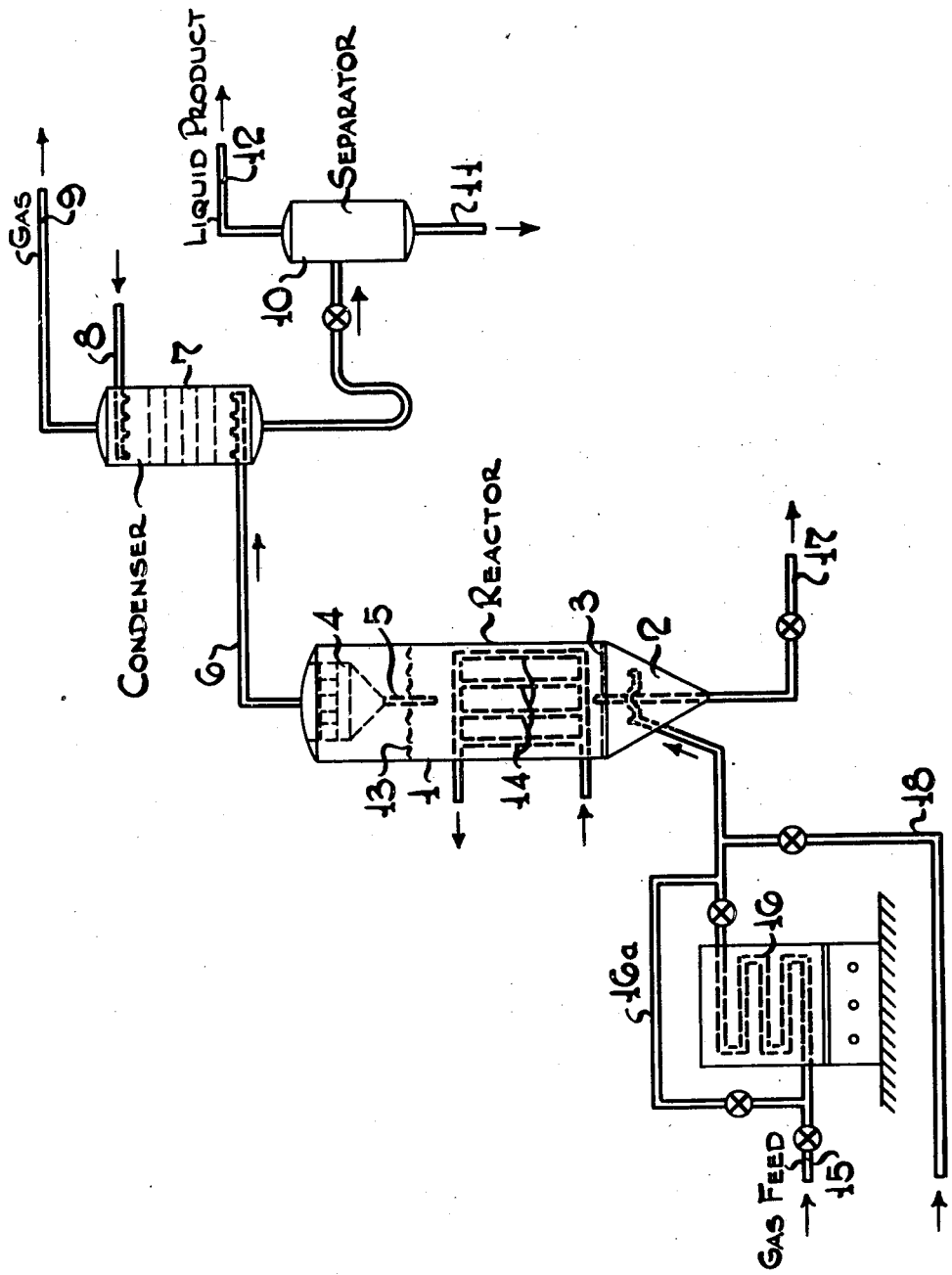

2,476,920

UNITED STATES PATENT OFFICE 2,476,920

CATALYST FOR REDUCTION OF OXIDES OF CARBON WITH HYDROGEN

Marnell A. Segura, Baton Rouge, La., assignor to Standard Oil Development Company, a corporation of Delaware Application December 22, 1945, Serial No. 637,062

14 Claims. (Cl. 260—449.6)

The present invention relates to improved catalysts for the synthesis of hydrocarbons and oxygen-containing derivatives by reduction of carbon oxides with hydrogen and more specifically to an iron catalyst which is particularly efficient, cheap and readily available. The nature of this catalyst, method of manufacture and use will be fully understood from the following description.

In the drawing there is shown an apparatus for conducting the synthetic production of hydrocarbons and oxygenated derivatives by reduction of carbon oxides with hydrogen and the drawing indicates the flow of the materials through the process.

Heretofore iron bearing catalysts, particularly iron oxide catalysts, have been used for bringing about the reaction between carbon oxides, particularly carbon monoxide, and hydrogen to form liquid hydrocarbons with or without the production of oxygen-containing derivatives such as alcohols, acids and the like. It has been generally the practice to produce these catalysts from purified iron salts but these catalysts require a long period of activation before they are of real use and they are also relatively expensive.

It has now been found that excellent iron bearing catalysts can be produced from certain pyritic ores, for example, pyrite, marcasite and pyrrhotite. Fortunately these ores are of low grade and are not in great demand. They are usually roasted in presence of air to produce sulfur dioxide for the manufacture of sulfuric acid, and are quite cheap. The roasting treatment which is accomplished at the temperatures of 1800–2200° F. converts the iron sulfides into $Fe_2O_3$ which is then gently sintered. A typical analysis of such a roasted material is as follows:

|  | Per cent |
|---|---|
| $Fe_2O_3$ | 96.2 |
| Reducible oxygen (combined with Fe) | 27.0 |
| Silica | 1.5 |
| Sulfur | less than .05 |

This material after roasting is extremely hard but it can be ground to any desired size. If the finished catalyst is to be used in fixed bed reactors, it is preferred to reduce the roasted material to granular form by crushing or grinding. Granules of the size of 4–8 mesh are suitable for use in most fixed bed reactors. If the finished catalyst is to be used in a fluid reactor, the roasted material is ground to a powder of suitable particle size for fluidizing under synthesis conditions. The following particle size distribution has been found to be suitable for use in fluid type reactors:

| Diameter | Per cent |
|---|---|
| 0 to 20 microns | 5 to 25 |
| 20 to 80 microns | 30 to 85 |
| Above 80 microns but still characterized as finely divided | 5 to 45 |

After the roasted material has been obtained in the desired particle size for fixed bed or fluid operation, as the case may be, it is impregnated with from 0.5 to 10% of a suitable promoter such as sodium carbonate, potassium carbonate, potassium chloride, potassium phosphate or alkali metal aluminates. In addition to the compounds of alkali metals listed above, other promoters such as copper, silver, nickel and thorium oxide may be used if desired. Instead of adding the promoters by impregnation, they may be mixed with the roasted ore and fused. The fused mass must then be broken down to the desired particle size.

In carrying out the process using the fluidized type of solid, the following description of a suitable apparatus may be of assistance:

Referring to the drawing, numeral 1 denotes a reaction vessel which is generally in the form of an upright cylinder with a conical base 2. A grid or screen 3 is located in the lower part of the cylinder so as to effect good gas distribution and in the upper portion of the cylinder a dust separator 4 is generally indicated. The separator is preferably of the type operating on centrifugal principles and the dust so separated is returned to the fluidized mass by the pipe 5 while the gas and vapor mixture is taken out by the pipe 6 to a scrubber condenser 7, fed with water by a pipe 8. The gas from which liquid products and final traces of catalyst have been removed is withdrawn by a pipe 9 and the liquid is separated in the vessel 10, water being withdrawn at the bottom by 11 and the hydrocarbon product by the pipe 12.

Within the reactor 1 it will be understood that the catalyst particles are distributed throughout the reacting gases in the form of a dense suspension, which comprises a denser phase below and a lighter phase above which are separated by a so-called interface or level which is indicated generally at 13. Within the denser phase cooling pipes 14 are located but it will be understood that they may be arranged in any preferred manner, not necessarily as shown.

Within this reactor the suspension is in vigorous motion which insures efficient utilization of the catalyst and accurate temperature control from top to bottom.

The gaseous feed consisting, for example, of a mixture of two parts of hydrogen to one part of CO is supplied by the pipe 15 through a heater 16 which is employed until the apparatus has been raised to reaction temperature. Thereafter the gas is preferably directed, or at least a part of it is directed around the heater by means of a pipe 16a and fed into the reactor below the grid 3. It will be understood that the reaction itself normally produces sufficient heat to maintain itself and, in fact, cooling by the pipes 14 will be required.

At intervals a portion of the catalyst may be withdrawn by a pipe 17 as indicated and the catalyst may be separated from the carrying gas and regenerated or reworked as desired. Fresh catalyst may be supplied by the pipe 18, preferably in a carrier gas which may be a portion of the feed gas.

Considerable variation may be made in the apparatus for carrying out the reaction in fluidized form but, in general, that shown in the drawing is suitable. In any case, it should consist of an enlarged vertical reaction vessel provided with cooling means. It should be fed at the bottom and the catalyst is preferably separated from the gas within the reaction shell so as to maintain the bulk of the catalyst always within the reactor and to withdraw a product gas. After the separation of the liquid product from the gas, the latter may be recirculated to the reaction chamber usually after a suitable adjustment of its composition.

In order to understand more fully the conditions of operation of the present process, it should be noted that in the fluidized type of reactor the gas velocity upward is adjusted so as to maintain the distribution of the catalyst particles throughout the gas in dense suspension. The velocity is preferably in the range from about .2 to 1.5 ft. per second, measured on the overall cross section of the reactor, and the upward velocity is sufficient to maintain the catalyst in suspension. The temperature and pressure conditions of the reactor depend to some extent on whether hydrocarbons alone are to be produced or if it is desired to produce oxygen containing materials as well. In general the temperature is from about 350° to 675° F. and it is preferred to use a pressure of 10 to 30 atmospheres, particularly for hydrocarbon production and even higher for the production of oxygenated materials.

In fixed bed operation the catalyst is used as mentioned above in granular form; the temperature and pressure conditions are substantially the same as given above.

The present catalyst is charged to the reactor whether of the type for fixed bed or fluidized operation and then should be reduced therein with hydrogen, preferably at a temperature from 550° to 1100° F. This is accomplished in a relatively short time and, as mentioned above, the catalyst does not have the long period of induction which is usually required with iron bearing catalysts. To more clearly illustrate the nature of the present catalyst and its use, the following examples may be considered:

Example 1

A catalyst was prepared from a sintered pyrite ash which contained 67.3% Fe and 27.0% reducible $O_2$ (combined with Fe) and less than 0.02% S by grinding to a powder and impregnating the powder with sodium carbonate solution so as to contain about .5% of the salt on drying. The product was dried at 240° F. and was then charged to a fluid solid type reactor such as illustrated above.

The catalyst was reduced with hydrogen at 700° F. for a period of about six hours and then fed directly with synthesis gas. The data given below include not only the data with this improved catalyst but also data typical of the iron bearing catalysts and obtained with an iron catalyst prepared by impregnating pelleted iron powder with $K_2CO_3$ and sintering in an $H_2$ atmosphere at 1470° to 1560° F. as described in the O. P. B. Report: U. S. Naval Technical Mission in Europe; Technical Report No. 248-45, "The Synthesis of Hydrocarbons and Chemicals from CO and $H_2$," September, 1945, page 52 and references cited thereon.

|  | Literature | Present Catalyst |
|---|---|---|
| $H_2$/CO in Fresh Feed | 1.27/1 | 1.50/1 |
| $H_2$/CO Consumed | 1.26/1 | 1.40/1 |
| Temperature, ° F | 608-626 | 600 |
| Pressure, #/Sq. In. | 300 | 275 |
| Fresh Feed, V./V./hr.[1] | 270 | 996 |
| CO Conversion | 75 | 98 |
| Carbon Balance | 100 | 91 |
| Per Cent CO to $C_4$+ | 41 | 47.4 |
| Ratio $C_4$+/$C_1$+[2] | .62 | .61 |
| cc. $C_4$+/meter[3] (CO+$H_2$) Consumed | 163 | 182 |
| Gallons $C_4$+/day/lb. of Catalyst | 0.04 | 0.18 |

[1] Measured at 32° F., 760 mm.
[2] Ratio of carbon in hydrocarbons in $C_4$ or higher fraction to carbon in total hydrocarbon product.

It should be noted that the pyrite ash catalyst required only a short reduction period and there was no induction period. The catalysts known in literature of this type usually required a long period of activation and are distinguished by an induction period of 2 to 5 days. It should also be noted that the CO conversion is considerably higher and the production of liquid hydrocarbons is better.

Example 2

Fixed bed units for testing the activity of synthesis catalysts were employed to test the quality of a granular pyrite ash catalyst made as above and impregnated with ½% of sodium carbonate. The data on four runs of this material are given below:

| Catalyst Form | ¼" Pills | 6-8 Mesh | 6-8 Mesh | 6-8 Mesh |
|---|---|---|---|---|
| Reduction Temperature °F | 700 | 700 | 900 | 900 |
| Temperature of Run °F | 575 | 576 | 586 | 581 |
| Pressure pounds | 250 | 240 | 249 | 250 |
| Space Velocity V./V./Hr.[1] | 212 | 198 | 195 | 206 |
| Yields: | | | | |
| cc./meter[3] (CO+$H_2$) Fed[1] Output | 137 | 129 | 154 | 152 |
| Percent CO conversion | 87 | 74 | 95 | 94 |
| $C_4$+/$C_1$+[2] | .63 | .66 | .60 | .63 |
| Material Balance per cent | 97 | 93 | 76 | 99 |

[1] Measured at 32°F., 760 mm.
[2] Ratio of carbon in hydrocarbons in $C_4$ or higher fraction to carbon in total hydrocarbon product.

From the above table the high activity of this catalyst can be readily observed.

Example 3

The following data were obtained in a small fluid unit using roasted pyrite ore which had been impregnated with 1% potassium chloride.

The catalyst was ground to the size distribution specified in the specification above and it was charged into the unit, reduced therein with hydrogen and two runs of about 24 hours each were made, carefully observed and all the data collected as follows:

|  | A | B |
|---|---|---|
|  |  | °F. |
| Catalyst Reduction Temperature | 671 |  |
| Catalyst Temperature During Run, °F | 550 | 600 |
| Reactor Pressure, p. s. i. g. | 277 | 275 |
| H₂/CO in Fresh Feed by Volume | 1.02 | 1.00 |
| H₂/CO Consumed, Output | 1.02 | .97 |
| Fresh Feed Rate, V./V./Hr.¹ | 450 | 1,040 |
| Per Cent CO Conversion, Output | 91 | 98 |
| Per Cent Carbon Balance | 88 | 96 |
| Per Cent Converted CO to C₄+ | 43.6 | 40.8 |
| Ratio C₄+/C₁+² | .70 | .62 |
| Output C₄+, cc./meter³ H₂+CO Consumed | 196 | 183 |
| Gallons C₄+/day/lb. Catalyst | .08 | .20 |

¹ Measured at 32° F., 760 mm.
² Ratio of carbon in hydrocarbons in C₄ or higher fraction to carbon in total hydrocarbon product.

The operation was smooth throughout, the yield excellent as seen from the above data.

The present catalyst is superior to other iron bearing catalysts, first, in respect to activity and selectivity in the direction of producing liquid hydrocarbons, and also in ability to produce only small proportions of methane and ethane, in superiority of the quality of the motor fuel produced and in respect to catalyst life. It is notable that this catalyst is superior in most respects to the purer iron bearing catalysts which are made directly from pure iron or from purified iron salts and from the oxide and carbonate ores. It is also superior to the less pure iron ore catalysts which have been employed.

I claim:

1. An improved process for producing a catalyst for reaction of carbon monoxide and hydrogen which comprises roasting and sintering an iron pyrite ore, withdrawing sulfur dioxide, grinding the sintered ash so obtained to powder, adding about 0.5 to 10% of an alkali metal compound promoting the synthesizing activity of iron catalysts and reducing the composite with hydrogen at a temperature of from 550° to 1100° F.

2. Process according to claim 1 in which the reduced ash is subsequently pilled.

3. An improved process for converting carbon monoxide and hydrogen to liquid hydrocarbons and oxygenated derivatives which comprises subjecting the gas mixture to contact with a reduced iron pyrites ash impregnated with about 0.5 to 10% of a promoter at a temperature of the range of 350 to 675° F. under a synthesis pressure.

4. An improved process for preparing a catalyst for synthesis of hydrocarbons from oxidation of carbon and hydrogen, which comprises roasting an iron pyrites ore in air under conditions of time and temperature to produce an ash containing less than 0.05% sulphur, sintering the ash reducing particle size to a desired range, adding about 0.5 to 10% of a suitable alkali metal compound promoter, and reducing with hydrogen at a temperature of from 550° to 1100° F.

5. An improved process for producing a catalyst for reaction of CO and hydrogen which comprises roasting an iron pyrites ore, withdrawing sulphur dioxide, sintering the ash, grinding the sintered ash so obtained to powder, adding about 0.5 to 10% of a suitable alkali metal compound promoter and reducing the composite with hydrogen at a temperature of from 550° to 1100° F.

6. The process of claim 3 in which said ash is a sintered material.

7. An improved process for preparing a catalyst for synthesis of hydrocarbons from oxidation of carbon and hydrogen which comprises roasting an iron pyrites ore, withdrawing sulphur dioxide, sintering the ash, grinding the sintered ash to obtain a powder of fluidizable particle size, adding an alkali metal compound promoter to the ash and reducing the composite with hydrogen at a temperature of from 550° to 1150° F.

8. An improved process for converting carbon monoxide and hydrogen to liquid hydrocarbons and oxygenated derivatives which comprises subjecting the gas mixture to contact with a dense fluidized mass of reduced sintered iron pyrites ash particles of fluidizable particle size impregnated with a suitable promoter, at a temperature of the range of 350° to 675° F. under a superatmospheric synthesis pressure.

9. The process of claim 3 in which said promoter is an alkaline substance.

10. The process of claim 3 in which said promoter is a halide of an alkali metal.

11. The process of claim 3 in which said promoter is potassium chloride.

12. The process of claim 1 in which said alkali metal compound is an alkaline substance.

13. The process of claim 1 in which said alkali metal compound is a halide of an alkali metal.

14. The process of claim 1 in which said alkali metal compound is potassium chloride.

MARNELL A. SEGURA.

REFERENCES CITED

The following references are of record in the file of this patent:

UNITED STATES PATENTS

| Number | Name | Date |
|---|---|---|
| 1,001,279 | Kayser | Aug. 22, 1911 |
| 1,158,664 | Ellis | Nov. 2, 1915 |
| 1,971,815 | Halvorsen | Aug. 28, 1934 |
| 2,180,672 | Frey | Nov. 21, 1939 |
| 2,183,145 | Michael | Dec. 12, 1939 |
| 2,365,094 | Michael et al. | Dec. 12, 1944 |
| 2,417,164 | Huber, Jr. | Mar. 11, 1947 |

FOREIGN PATENTS

| Number | Country | Date |
|---|---|---|
| 6,476 | Great Britain | 1914 |